US011465681B2

(12) United States Patent
Riley et al.

(10) Patent No.: US 11,465,681 B2
(45) Date of Patent: Oct. 11, 2022

(54) POSITION IDENTIFICATION ASSEMBLY FOR STEERING COLUMN

(71) Applicant: STEERING SOLUTIONS IP HOLDING CORPORATION, Saginaw, MI (US)

(72) Inventors: Blake J. Riley, Saginaw, MI (US); Robert C. Derocher, Essexville, MI (US); Keith A. Kidder, Saginaw, MI (US); Paul M. Fisher, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 824 days.

(21) Appl. No.: 16/382,682

(22) Filed: Apr. 12, 2019

(65) Prior Publication Data
US 2020/0324814 A1   Oct. 15, 2020

(51) Int. Cl.
*B62D 15/02* (2006.01)
*B62D 1/184* (2006.01)

(52) U.S. Cl.
CPC ......... *B62D 15/0215* (2013.01); *B62D 1/184* (2013.01)

(58) Field of Classification Search
CPC .... B62D 15/0215; B62D 1/184; B62D 1/183; B62D 1/181; B62D 1/185; B60R 11/00; B60R 16/023; B60R 21/01; B60R 2011/0042
USPC .......................................................... 701/41
See application file for complete search history.

(56) References Cited

U.S. PATENT DOCUMENTS

| | | | |
|---|---|---|---|
| 2014/0260761 A1* | 9/2014 | Soderlind | B62D 1/183 74/493 |
| 2015/0203150 A1* | 7/2015 | Ognibene | B62D 5/005 180/403 |
| 2016/0375860 A1* | 12/2016 | Lubischer | B62D 1/183 74/493 |

(Continued)

FOREIGN PATENT DOCUMENTS

| | | |
|---|---|---|
| CN | 108116486 A | 6/2018 |
| DE | 102004044472 A1 | 3/2006 |

(Continued)

OTHER PUBLICATIONS

First Chinese Office Action and Search Report dated Mar. 2, 2022 for Chinese Application No. 202010285151.1, 10 pages.

*Primary Examiner* — Jonathan M Dager
*Assistant Examiner* — Jean W Charleston
(74) *Attorney, Agent, or Firm* — Dickinson Wright PLLC

(57) ABSTRACT

A position identification assembly for a steering column is provided. The assembly may include a mount bracket, a steering column, a sensor, and a controller. The mount bracket may define an opening to the cavity. The steering column may be mounted to the mount bracket for translation at least partially in to and out of the cavity and the steering column may define one or more physical features therealong. The sensor may be secured to the mount bracket to detect the physical features. Each of the one or more physical features may be arranged upon the steering column such that the sensor detects the one or more physical features when the steering column translates between positions and may send a signal to the controller reflecting the same. The controller is programmed to identify a steering column position based on the received signal.

19 Claims, 4 Drawing Sheets

(56) References Cited

U.S. PATENT DOCUMENTS

| | | |
|---|---|---|
| 2017/0029009 A1 | 2/2017 | Rouleau |
| 2017/0050665 A1* | 2/2017 | Appleyard ............. B62D 1/195 |
| 2017/0174249 A1* | 6/2017 | Stinebring ............ B62D 1/181 |
| 2017/0313343 A1* | 11/2017 | Kim ....................... B62D 1/184 |
| 2018/0086378 A1 | 3/2018 | Bell et al. |
| 2019/0291773 A1* | 9/2019 | Specht ................... B62D 1/184 |
| 2019/0291774 A1* | 9/2019 | Buzzard ................. B62D 1/185 |
| 2020/0130723 A1* | 4/2020 | Cao ........................ B62D 1/183 |

FOREIGN PATENT DOCUMENTS

| | | | |
|---|---|---|---|
| DE | 102005022117 A1 * | 11/2006 | ........... F16J 15/0825 |
| DE | 102010020087 A1 | 11/2011 | |
| DE | 102019108466 A1 | 2/2020 | |
| JP | 2018174482 A * | 11/2018 | ........... G02B 27/646 |
| KR | 20040018790 A | 3/2004 | |
| WO | WO-0192071 A1 * | 12/2001 | ............. B60R 21/01 |

\* cited by examiner

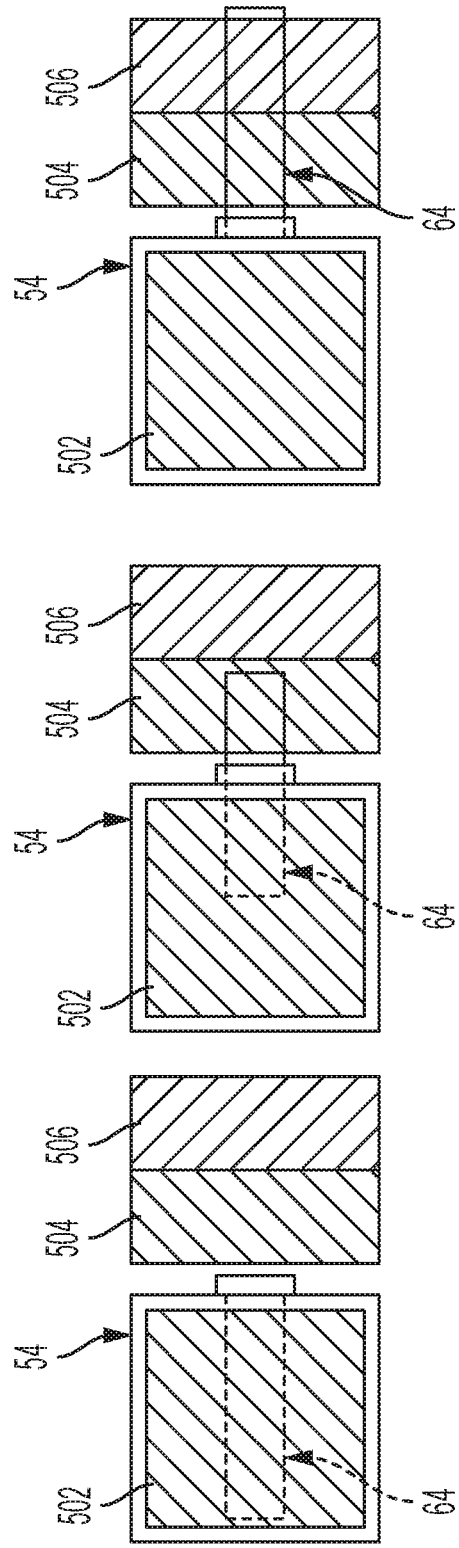

POSITION IDENTIFICATION ASSEMBLY FOR STEERING COLUMN

BACKGROUND

A detection assembly may be used to identify a position of a telescoping steering column of a steering assembly. In one example, a sensor may detect an angle of gears of the steering column assembly and translate the detected angles to a relative linear position of the steering column. This detection assembly, however, requires cost-prohibitive components and requires component contact operations that cause wear on the components. Further, an assembly including the gears described above has a size exceeding acceptable packaging constraints.

SUMMARY

According to an embodiment of the present disclosure, a position identification assembly for a steering column is provided. The position identification assembly for a steering column includes a mount bracket, a steering column, a sensor, and a controller. The mount bracket is for securing to a portion of a steering assembly and defines an opening to the cavity. The steering column is mounted to the mount bracket for translation at least partially in to and out of the cavity and the steering column defines one or more physical features therealong. The sensor is secured to the mount bracket to detect the one or more physical features of the steering column. The controller is in communication with the sensor. Each of the one or more physical features is arranged upon the steering column such that the sensor detects the one or more physical features when the steering column translates between positions adjacent the sensor and sends a signal to the controller reflecting the same. The controller is programmed to identify a steering column position based on the received signal.

According to another embodiment of the present disclosure, a steering column position detection assembly is provided. The steering column position detection assembly includes a bracket, a jacket component, a telescoping column, a magnet, a sensor, and a controller. The bracket is for mounting to a portion of a steering assembly and defines a cavity. The jacket component is secured to the bracket and includes a first jacket component and a second jacket component. The telescoping column is disposed within the second jacket component for translating between at least a first position and a second position. One of the positions is a position in which the telescoping column is at least partially disposed within the cavity. The magnet is secured to the telescoping column. The sensor is secured to the first jacket component adjacent an opening to the cavity to identify a magnetic field strength of the magnet. The controller is in communication with the sensor and programmed to identify a position of the telescoping column responsive to receipt of a signal from the sensor identifying the magnetic field strength of the magnet.

According to yet another embodiment of the present disclosure, a steering column position identification assembly is provided. The steering column position identification assembly includes a bracket, a steering column housing, a sensor, and a controller. The bracket defines a cavity and an opening to the cavity. The steering column is mounted to the bracket for translation. The sensor is mounted to the bracket adjacent the opening. The controller is in communication with the sensor and programmed to identify an absolute position of the steering column housing relative to one or more predetermined zones based on receipt of a sensor signal. Each of the one or more predetermined zones is reflective of an operation command for output by the controller.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 5A is a top plan view illustrating an example of a first position of the column assembly of FIG. 2 relative to predetermined position zones;

FIG. 5B is a top plan view illustrating an example of a second position of the column assembly of FIG. 2 relative to the predetermined position zones; and FIG. 5C is a top plan view illustrating an example of a third position of the column assembly of FIG. 2 relative to the predetermined position zones.

DETAILED DESCRIPTION

Figure 1:
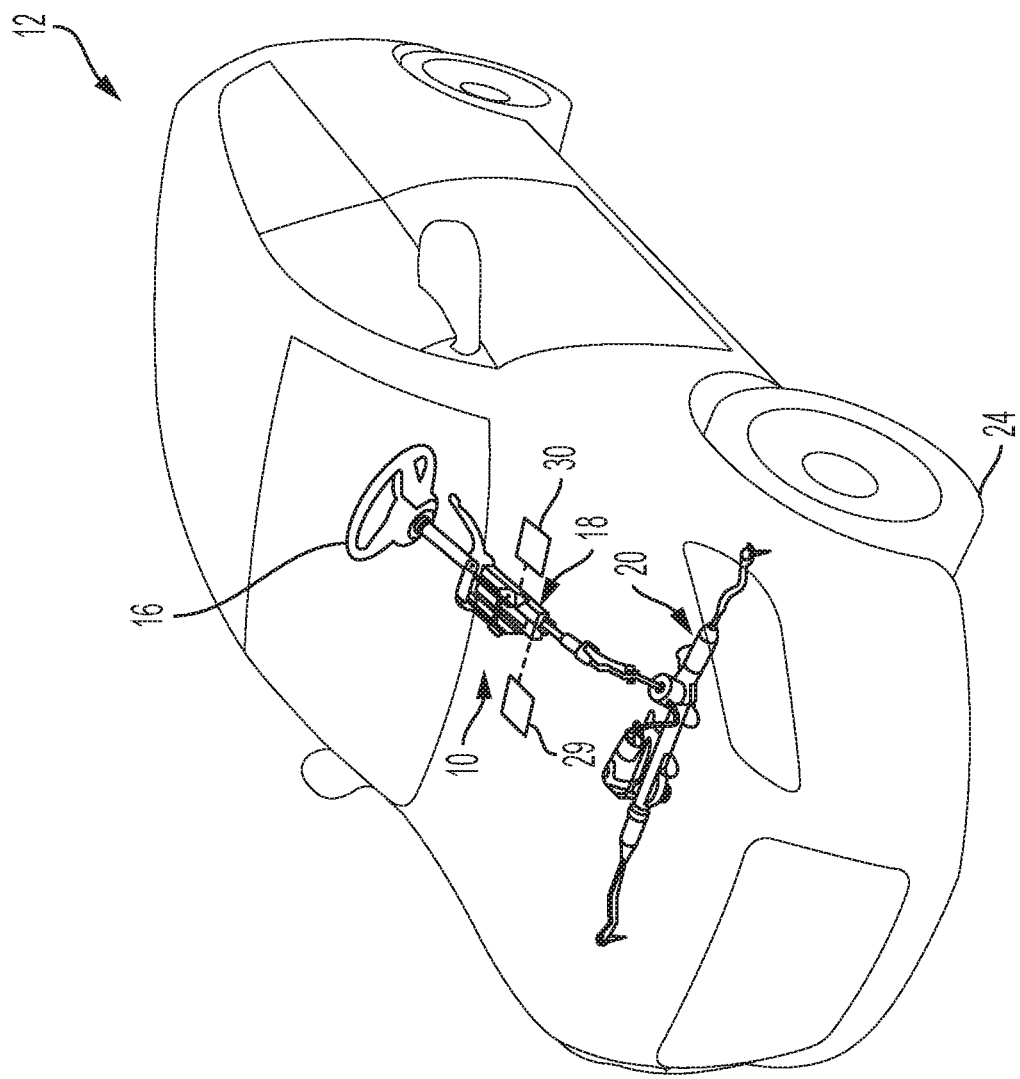
FIG. 1 is a perspective view of an example of a portion of a steering assembly.

Referring now to the Figures, where the invention will be described with reference to specific embodiments, without limiting same, FIG. 1 illustrates an example of a steering assembly, referred to generally as a steering assembly 10 herein. The steering assembly 10 is shown disposed within a vehicle 12 in FIG. 1. The steering assembly 10 may assist in converting user inputs from a steering wheel 16 to direct movement of the vehicle 12. In this example, the vehicle 12 is a car, however, it is contemplated that the steering assembly 10 may be used to assist in steering other types of vehicles such as trucks, boats, aircraft, or other similar vehicles without departing from a scope of the present disclosure.

The steering assembly 10 may include the steering wheel 16 rotatably secured to an electric power steering assembly 18. The electric power steering assembly 18 may be operatively connected to a rack and pinion system 20 or a steer-by-wire system (not shown). The steering wheel 16, the electric power steering assembly 18, and the rack and pinion system 20 may be arranged with one another to direct movement of a front set of wheels 24 (only one front wheel 24 is shown in FIG. 1) of the vehicle 12 based on a driver's input. For example, the rack and pinion system 20 may be operatively connected to each of the front set of wheels 24 via knuckles and tie rods to convey driver input from the steering wheel 16 for movement of each of the front set of wheels 24.

The steering assembly 10 may be in communication with a controller 29. The controller 29 may include programming to direct operation of components of the steering assembly 10 and/or to direct operation of other vehicle 12 components. The programming, for example, may trigger an output of one or more vehicle operation commands based on received signals or detected vehicle conditions. The steering wheel 16 may include an airbag assembly therein and the controller 29 may include programming to direct operation of the airbag assembly.

Optionally, the steering assembly 10 may be in communication with a self-steering unit 30, such as an advanced driver assistance system or the like. The self-steering unit 30 may include programming to direct movement of the vehicle 12 without driver input to the steering wheel 16.

Figure 3:
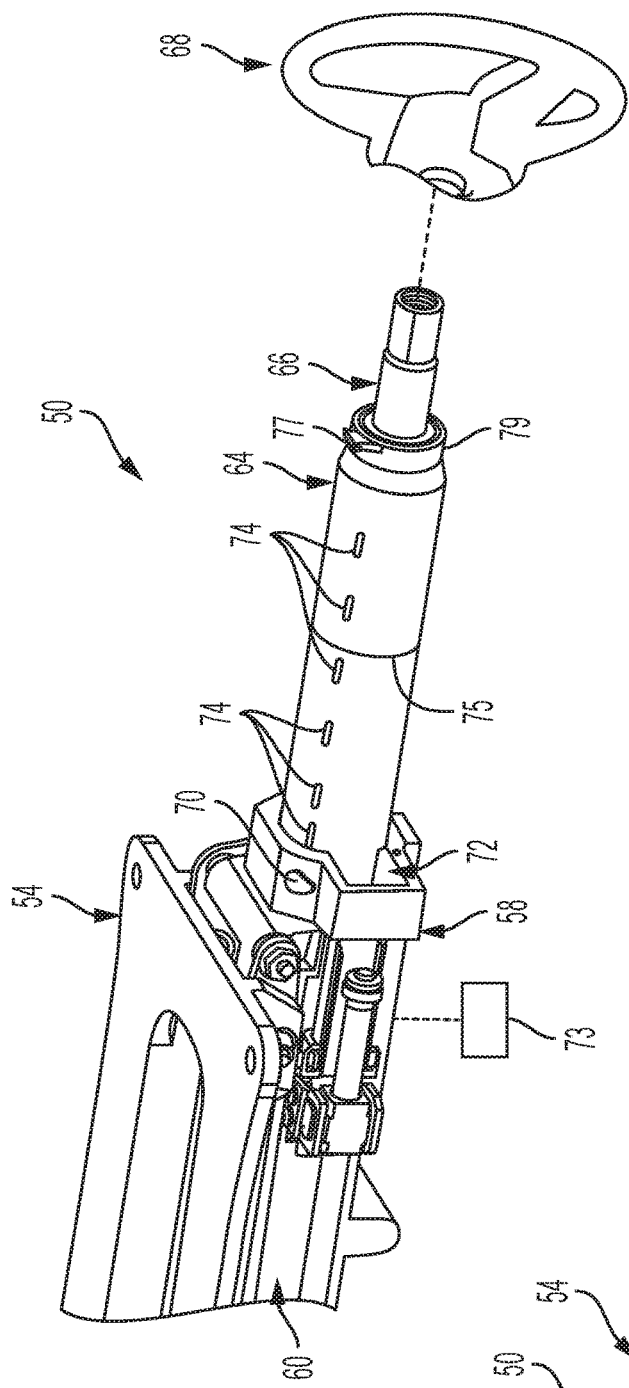
FIG. 3 is a perspective view of the portion of the steering column assembly of FIG. 2 showing the column assembly in a second position.
Figure 2:
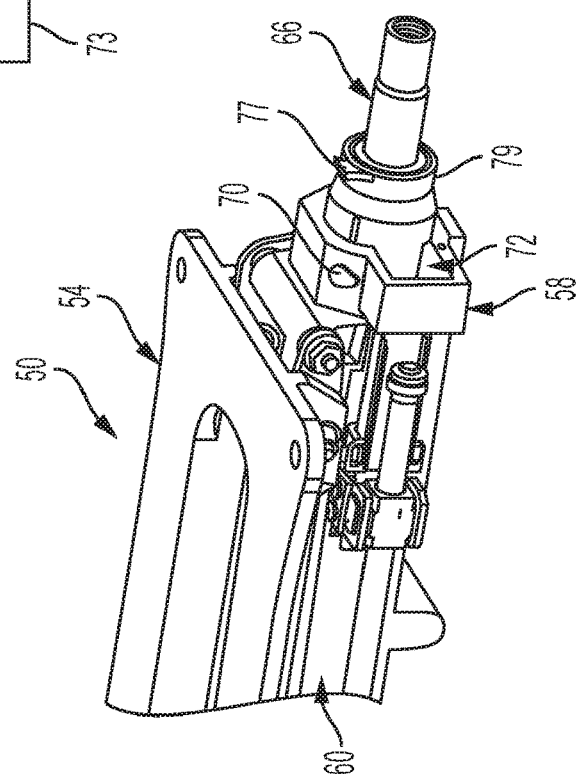
FIG. 2 is a perspective view of an example of a portion of a steering column assembly showing a column assembly in a first position.

FIGS. 2 and 3 are perspective views illustrating an example of a portion of a steering assembly with a column assembly shown in two positions, referred to generally as a steering column assembly 50 herein. The steering column assembly 50 may include components of a position identification assembly to assist in identifying a steering column position. In contrast to prior art assemblies, this position identification assembly may operate without requiring that components contact one another during operation, such as gears of the prior art assemblies. In FIG. 2, the steering column assembly 50 is shown in a first position, also referred to as a stowed position. In FIG. 3, the steering column assembly 50 is shown in a second position, also referred to as an extended position. The steering column assembly 50 includes a bracket 54 for supporting and mounting the steering column assembly 50. The bracket 54 may be structured for mounting to a portion of a steering assembly, such as the steering assembly 10.

The steering column assembly 50 may further include a jacket member having a first jacket component and a second jacket component 58. The first jacket component may also be referred to as an upper jacket component or a steering column housing 64 and the second jacket component 58 may also be referred to as a lower jacket component. It is contemplated that the bracket 54 and the second jacket component 58 may be formed as a single component or as separate components.

The bracket 54 and/or the second jacket component 58 may define a cavity 60. The cavity 60 may be sized to receive a portion of the steering column assembly 50, such as the steering column housing 64. The steering column housing 64 may define a cavity sized to receive a portion of a steering column 66. The steering column 66 may be a telescoping steering column.

In one example, the bracket 54 and the steering column housing 64 may be arranged with one another such that the steering column housing 64 may at least partially translate in to and out of the cavity 60 between at least the first position and the second position. The steering column housing 64 may be in mechanical communication with a motor mechanism (not shown) to direct the translation. It is also contemplated that the steering column housing 64 may be in mechanical communication with a non-motorized mechanism (not shown) to direct the translation. As such, a steering wheel 68 secured to the steering column 66 may move relative to a driver positioned adjacent thereto to define various distances between the steering wheel 68 and the driver. These various distances may be detected by the steering column assembly 50 and, for example, associated with triggers for vehicle operation commands as further described herein.

For example, the steering column assembly 50 may include a sensor 70 disposed on the bracket 54 or the second jacket component 58. The sensor 70 may be located adjacent an opening 72 defined by the bracket 54 or the second jacket component 58. It is also contemplated that the sensor 70 may be positioned at alternative locations of the steering assembly 50. For example, the sensor 70 may be positioned at a location based on a capability of the sensor 70 to detect the one or more physical features. The sensor 70 may be in electrical communication with a controller 73. While the controller 73 is shown as a single unit in FIG. 3, those in the art will appreciate that the controller 73 or particular vehicle may comprise more than one controller to direct operations of vehicle components and systems. It is also contemplated that the steering column assembly 50 may include more than one sensor 70.

For example, a second sensor (not shown) may be mounted at another location and the controller 73 may include programming to identify a steering column or steering column housing position based on signals received from the two sensors. Having two sensors may increase a reliability of identification of the steering column or steering column housing position. The sensor 70 and the second jacket component 58 may be arranged with one another such that the sensor 70 may have a view to the steering column housing 64 without any ferrous materials therebetween. The sensor 70 may be arranged with the steering column housing 64 to identify a position thereof. The sensor 70 may be a Hall effect sensor. The Hall effect sensor may be back-biased. A back-biased Hall effect sensor includes a magnet.

In one example, the sensor 70 may identify the position of the steering column housing 64 based on detected physical features defined by the steering column housing 64. In this example, the steering column housing 64 may define one or more physical features, such as one or more openings 74. Each of the one or more openings 74 may be holes or slots cut through or partially through the steering column housing 64. Each of the one or more openings 74 may also be formed to define a tapered shape detectable by the sensor 70. The one or more openings 74 may be located along the steering column housing 64 to correspond to one of a plurality of predetermined zones as further described herein. A spacing between the one or more openings 74 may also be detected by the sensor 70.

It is contemplated that the one or more openings 74 may be located along the steering column 66 itself in an embodiment without the steering column housing 64. Each of the one or more openings 74 may be sized, shaped, or disposed in a location to correspond to one of the plurality of predetermined zones. In another example, the one or more openings 74 may be arranged with one another to define a pattern corresponding to one of the plurality of predetermined zones. Examples of the pattern may include an arrangement of the one or more physical features along the steering column housing 64 in which subsequent openings or slots may have different sizes or shapes. In one example, the one or more openings 74 may be defined and/or arranged with one another in a sequence in which a first of the one or more openings 74 is a short and wide slot, a second is a long and narrow slot, and a third is a location without any slot. It is contemplated that a size, shape, and arrangement of the one or more physical features may also be based on manufacturing benefits as well.

The physical features defined by the steering column housing 64 may also be one or more material layers or component portions having varied materials. The steering column housing 64 may be formed of a first material and a second material. In one example, the first material may be a ferrous metal and the second material may be a non-ferrous metal. Examples of the ferrous metal include carbon-based steels, and examples of the non-ferrous metal include plastic, aluminum, and brass. The forming of the steering column housing 64 may align the first material and the second material adjacent one another. The sensor 70 may detect this change in material (change in material represented at line 75 of FIG. 3) when the steering column housing 64 translates past the sensor 70. The sensor 70 may then send a signal to the controller 73 reflective of the same. The controller 73 may include programming to identify a region including the change in material and to associate the steering column housing 64 position with one of the plurality of predetermined zones as further described herein.

In these examples, the physical features may be arranged with the sensor 70 such that the sensor 70 detects the physical feature and then sends a signal to the controller 73 reflecting the same. The physical features may also alter a magnetic field thereabout and detectable by the sensor 70. The controller 73 may then identify a position of the steering column housing 64 based on the received signal and output an operational command based on the identified position. Examples of the operational commands include permitting an airbag deployment, prevention of deployment of an airbag, permitting or preventing a vehicle start, and directing movement of the steering column housing 64 itself.

Figures 4A, 4B:
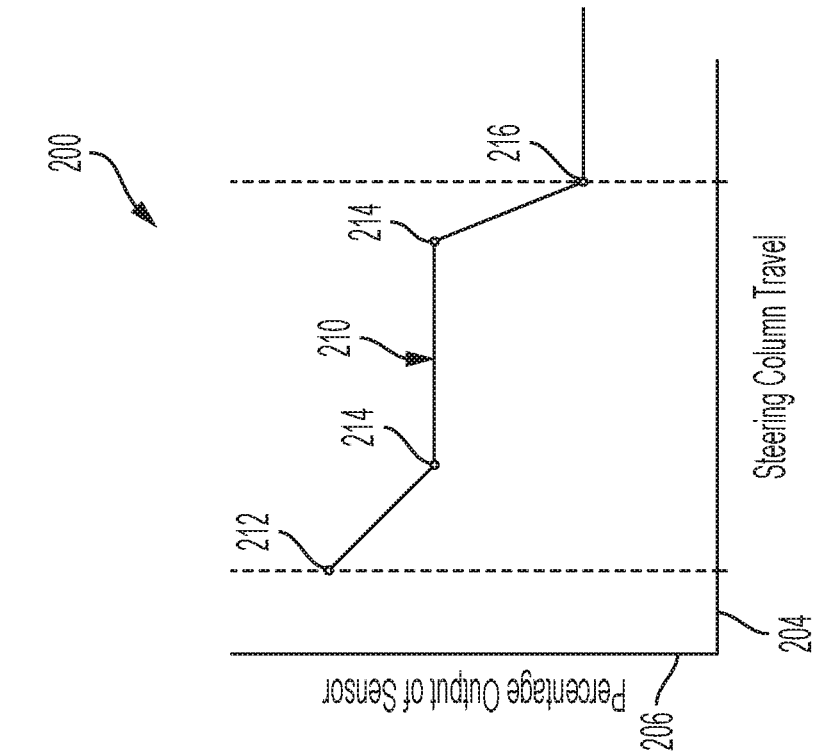
FIG. 4A is a table illustrating an example of a relationship between a sensor output and detected physical features of a column assembly position.
FIG. 4B is a graph illustrating an example of a relationship between a sensor output and a column assembly position.

FIG. 4A is a table illustrating an example of a relationship between sensor-detected physical features of a steering column assembly and a column housing position and/or a steering column position, referred to generally as a table 100 herein. It should be noted that values shown in the table 100 are specific to a particular type of sensor and that the values may be different for other types of sensors. A first column 104 includes information relating to a physical feature of a portion of a steering assembly, such as the steering column housing 64. A second column 106 includes information relating to a detected magnetic field strength of the physical feature of the first column 104, represented as a percentage output of a sensor, such as the sensor 70. The detected magnetic field strength may also be reflective of a magnetic field amplitude or a magnetic field direction. For example, when the detected physical feature is air (e.g., the sensor is adjacent an open space and detects the same), a percent output of the sensor may be substantially equal to an identifiable twenty-five percent. As another example, when the physical feature is a solid (e.g. the sensor is adjacent a solid feature and detects the same), the percent output of the sensor is substantially equal to an identifiable forty-seven percent.

In another example, the steering column assembly 50 may include components to identify a steering column position based on a detected magnetic field strength of a magnet. In this example, a magnet 77 may be disposed upon a first end 79 of the steering column housing 64. The first end 79 may be located opposite the bracket 54. It is contemplated that the magnet 77 may be disposed upon the steering column housing 64 at alternative locations without departing from the scope of this disclosure. Examples of the magnet 77 include a sheet magnet, a rare earth magnet, and a ferrite magnet. Additionally, a length of, a width of, a depth of, and/or spacing between each of the physical features may be varied to provide different sensor detection scenarios to assist in identifying magnetic field strengths of each of the one or more physical features.

The controller 73 may include programming to identify a position of the steering column housing 64 based on a detected magnetic field strength of the magnet 77. For example, the controller 73 may receive a signal from the sensor 70 identifying a magnetic field strength of the magnet 77. The controller 73 may then access a table, such as the table 100, and identify a position of the steering column housing based on the magnetic field strength detected.

FIG. 4B is a graph illustrating an example of a relationship between a magnetic field strength detected by a sensor and a column housing position or steering column position, referred to generally as a graph 200 herein. An X-axis 204 represents a travel distance of a steering column or steering column housing. In one example, the travel distance may relate to a transition between a stowed position and a fully extended position of the steering column or the steering column housing. A Y-axis 206 represents a percentage output of a sensor, such as the sensor 70. Plot 210 represents a mapping comparison of a magnetic field strength and position of a physical feature of the steering column or steering column housing. The graph 200 may be stored within or accessible by the controller 73 to assist in identifying a position of the steering column housing 64 based on signals received from the sensor 70.

For example, a first location 212 on the graph 200 may be reflective of a sensor, such as the sensor 70, having a percentage output substantially equal to forty-seven percent, or a percent value between forty-five percent and forty-nine percent. The first location 212 may be reflective of the sensor 70 detecting a solid portion of the steering column housing 64 or the steering column 66, such as being in a stowed position and within the first predetermined zone. A second location 214 on the graph 200 may be reflective of the sensor 70 having a percentage output substantially equal to thirty-five percent, or a percent value between thirty-three percent and thirty-seven percent.

The second location 214 may be reflective of the steering column housing 64 being in a mid-extension position and within a second predetermined zone and the sensor 70 detecting a slot having a length substantially equal to five millimeters. A third location 216 on the graph 200 may be reflective of the sensor 70 having a percentage output substantially equal to twenty-eight percent, or a percent value between twenty-six percent and thirty percent. The third location 216 may be reflective of the steering column housing 64 or the steering column 66 being in an extended position and within a third predetermined zone and the sensor 70 detecting a slot having a length substantially equal to ten millimeters.

As such, the controller 73 may access the table 100 and/or the graph 200 upon receipt of the sensor signal reflective of a detected magnetic field strength and identify a position of the steering column housing 64 or the steering column 66 based thereon. The controller 73 may then output an operation command relating to the identified position of the steering column housing 64 or the steering column 66.

FIGS. 5A through 5C are top plan schematic views illustrating example positions of components, such as the steering column housing 64 or the steering column 66, of the steering column assembly 50 relative to predetermined position zones. In FIG. 5A, the steering column housing 64 is shown in a first position or a stowed position. The first position may be further defined by a portion of the steering column housing 64 being positioned within a first predetermined zone 502. In FIG. 5B, the steering column housing 64 is shown in a second position or a mid-extension position. The second position may be further defined by a portion of the steering column housing 64 being within a second predetermined zone 504 or a portion of the steering column housing 64 being within the first predetermined zone 502 and the second predetermined zone 504. In FIG. 5C, the steering column housing 64 is shown in a third position or a fully extended position. The third position may be further defined by a portion of the steering column housing 64 being within a third predetermined zone 506 or a portion of the steering column housing 64 being within the first predetermined zone 502, the second predetermined zone 504, and the third predetermined zone 506. The positions shown are reflective of examples of translation capabilities of the steering column housing 64 or the steering column 66 though it is to be understood that the steering column housing 64 or the steering column 66 may translate to one or more positions between the three positions shown in FIGS. 5A through 5C.

As mentioned above, the steering column housing 64 or the steering column 66 may translate relative to the bracket 54 and/or the second jacket component 58. Positions of the steering column housing 64 or the steering column 66 may correspond to predetermined position zones. Each of the predetermined position zones may be reflective of a zone in which various vehicle operation commands may be triggered or prevented from triggering.

For example, the first predetermined zone 502 may correspond to the steering column housing 64 being in the first position shown in FIG. 5A. In this first predetermined zone 502, a steering wheel, such as the steering wheel 16, may be spaced an acceptable distance from a driver to permit airbag deployment. The controller 73 may include programming to, for example, permit deployment of an airbag when the steering column housing 64 is identified as being located within the first predetermined zone 502.

As another example, the second predetermined zone 504 may correspond to the steering column housing 64 being in the second position shown in FIG. 5B. In this second predetermined zone 504, the steering wheel may be spaced from the driver an acceptable distance to permit airbag deployment. The controller 73 may include programming to, for example, permit a vehicle start when the steering column housing 64 is identified as being within the second predetermined zone 504.

As yet another example, a third predetermined zone 506 may correspond to the steering column housing 64 being in the third position shown in FIG. 5C. In this third predetermined zone 506, the steering wheel may be spaced an unacceptable distance from the driver to permit airbag deployment. The controller 73 may include programming to, for example, prevent deployment of the airbag when the steering column housing 64 is identified as being within the third predetermined zone 506.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A position identification assembly for a steering column comprising:
   a mount bracket for securing to a portion of a steering assembly and defining a cavity and an opening to the cavity;
   a steering column mounted to the mount bracket for translation at least partially in to and out of the cavity, the steering column defining one or more physical features therealong;
   a sensor secured to the mount bracket to detect:
      the one or more physical features of the steering column; and
      a magnetic field alerted by the one or more physical features; and
   a controller in communication with the sensor,
   each of the one or more physical features is arranged upon the steering column such that the sensor detects the one or more physical features when the steering column translates between positions adjacent the sensor and sends a signal to the controller reflecting the same, the controller being programmed to:
      identify a steering column position based on the received signal; and
      output a system operation command based on the detected magnetic field altered by the one or more physical features.

2. The assembly of claim 1, wherein the sensor is a back-biased Hall effect sensor.

3. The assembly of claim 1, wherein each of the one or more physical features defines one of a pattern, an opening, or a slot.

4. The assembly of claim 1, wherein the controller is further programmed to identify the steering column position within one or more predetermined zones based on the received sensor signal.

5. The assembly of claim 4, wherein to responsive to detection of the steering column being within one of the one or more predetermined zones, the system operation command corresponds to a respective one of the one or more predetermined zones.

6. The assembly of claim 5, wherein the system operation command is one of a permit airbag deployment command, a permit vehicle start command, a prohibit vehicle start command, or a prevent airbag deployment command.

7. The assembly of claim 1, wherein the one or more physical features is a pair of openings spaced from one another a predetermined distance, and the system operation command corresponds to detection of the predetermined distance between the pair of openings.

8. The assembly of claim 1, wherein the one or more physical features is at least two material layers each material layer being of a material different than the other of the at least two material layers, the sensor being arranged with the cavity of the mount bracket to detect the material differences of the two material layers in the steering column.

9. A steering column position detection assembly comprising:
   a bracket for mounting to a portion of a steering assembly and defining a cavity and an opening to the cavity;
   a jacket component secured to the bracket and including a first jacket component and a second jacket component;
   a telescoping column disposed within the second jacket component for translating between at least a first position and a second position, one of the positions being a position in which the telescoping column is at least partially disposed within the cavity;

a magnet secured to the telescoping column;
a sensor secured to the first jacket component adjacent an opening to the cavity to identify a magnetic field strength of the magnet; and
a controller in communication with the sensor and programmed to:
identify a position of the telescoping column relative to one or more predetermined zones responsive to receipt of a signal from the sensor identifying the magnetic field strength of the magnet; and
output an operation command based on the identified magnetic field strength.

10. The assembly of claim 9, wherein the controller is further programmed to identify the position of the telescoping column relative to the one or more predetermined zones based on the identified magnetic field strength.

11. The assembly of claim 10, wherein the one or more predetermined zones include a first predetermined zone corresponding to the command to permit airbag deployment, a second predetermined zone corresponding to a command to permit a vehicle start, and a third predetermined zone corresponding to the command to prohibit airbag deployment.

12. The assembly of claim 9, wherein the operation command includes one of a command to permit deployment of an airbag or command to prevent deployment of an airbag.

13. The assembly of claim 9, wherein the magnet is secured to the telescoping column at a column end opposite the bracket.

14. The assembly of claim 9, wherein the sensor is a back-biased Hall effect sensor.

15. A steering column position identification assembly comprising:
a bracket defining a cavity and an opening to the cavity;
a steering column housing mounted to the bracket for translation, the steering column housing including a first end and a second end;
a sensor mounted to the bracket adjacent the opening;
a magnet the magnet being mounted to the second end of the steering column housing, the sensor and the magnet being arranged with one another such that the sensor detects a magnetic field strength of the magnet; and
a controller in communication with the sensor, the controller is programmed to:
identify an absolute position of the steering column housing relative to one or more predetermined zones based on receipt of a sensor signal, each of the one or more predetermined zones being reflective of an operation command for output by the controller; and
output an operation command based on the detected magnetic field strength.

16. The assembly of claim 15, wherein the steering column housing defines one or more openings along a body of the steering column housing, each of the one or more openings corresponding to one of the one or more predetermined zones, the sensor being a Hall effect sensor to detect an opening of the one or more openings, the controller being further programmed to associate the detected opening with the operation command, wherein the operation command corresponds corresponding to the one or more predetermined zones.

17. The assembly of claim 15, wherein the steering column housing includes at least two different materials, the at least two different materials being adjacent one another defining a material transition region, the sensor being arranged with the steering column to detect the material transition region when the steering column housing translates thereby, the controller being further programmed to output the operation command responsive to detection of the material transition region.

18. The assembly of claim 17, the operation command being one of a permit vehicle start, prevent vehicle start, permit airbag deployment, or prevent airbag deployment.

19. The assembly of claim 15 wherein the controller is further programmed to access a magnetic field output graph including a correlation of the detected magnetic field strength to a predetermined zone, the controller being further programmed to output an operation command based on the correlated predetermined zone.

* * * * *